United States Patent [19]

Sakamoto et al.

[11] Patent Number: 4,504,764

[45] Date of Patent: Mar. 12, 1985

[54] CATHODE RAY TUBE WITH COLOR SELECTING GRILL

[75] Inventors: Yasuhiro Sakamoto, Tokyo; Koji Saita, Yokohama; Akihiro Kojima, Tokyo, all of Japan

[73] Assignee: Sony Corporation, Tokyo, Japan

[21] Appl. No.: 376,146

[22] Filed: May 7, 1982

[30] Foreign Application Priority Data

May 8, 1981 [JP] Japan ............................ 56-67269[U]

[51] Int. Cl.³ ........................ H01J 29/07; H01J 1/53; F16M 13/00

[52] U.S. Cl. .................................. 313/403; 313/269; 313/407; 248/559

[58] Field of Search ............... 313/402, 403, 407, 456, 313/482, 269; 248/559

[56] References Cited

U.S. PATENT DOCUMENTS

| | | | |
|---|---|---|---|
| 2,722,623 | 11/1955 | Law | 313/458 |
| 2,930,918 | 3/1960 | Coffin, Jr. | 313/269 X |
| 3,638,063 | 1/1972 | Tachikawa et al. | 313/269 X |
| 4,291,253 | 9/1981 | Ohkoshi et al. | 313/269 X |

*Primary Examiner*—Palmer Demeo

*Attorney, Agent, or Firm*—Hill, Van Santen, Steadman & Simpson

[57] ABSTRACT

A cathode ray tube having a phosphor layer formed on an inner surface of a panel of an envelope, a color selecting aperture grill formed of a number of grid elements and located within the envelope opposing to the phosphor layer, a metal wire for coupling the number of the grid elements, an electron gun located within the envelope and a deflecting device located around the envelope is disclosed, in which the resonance frequency of at least one grid element of the color selecting grid is selected different from that of another grid element in the vicinity thereof.

2 Claims, 6 Drawing Figures

CATHODE RAY TUBE WITH COLOR SELECTING GRILL

BACKGROUND OF THE INVENTION

1. Field of the Invention

The present invention relates generally to a cathode ray tube and more particularly to a colour cathode ray tube with an improved colour selecting electrode.

2. Description of the Prior Art

A conventional colour cathode ray tube is generally constructed as shown in a schematic diagram of FIG. 1, such that a glass envelope 1 is provided, a colour phosphor screen or layer 2 (composed of a group of respective colour phosphor stripes) is formed on the inner surface of a panel of the glass envelope 1 and a colour selecting electrode 3 is located within the envelope 1 opposing to the colour phosphor screen 2. The electron beam 5 emitted from an electron gun 4 located within the neck portion of the envelope 1 is scanned by an electromagnetic deflecting device 6 provided around the neck portion of the envelope 1 in the horizontal and vertical directions and then passed through the colour selecting electrode 3 to and then impinges on a desired colour phosphor stripe of the phosphor screen 2. In the colour selecting electrode 3, as shown in FIGS. 2 and 3, a number of band-shaped grid elements 11 are stretched between one pair of opposing sides of a frame 10 so as to be held so they are parallel to the phosphor stripes. Each of apertures 12 defined between the adjacent band-shaped grid elements 11 arranged with a predetermined pitch forms a beam penetrating aperture. Such colour selecting electrode 3 is called an aperture grill.

In the colour cathode ray tube utilizing such aperture grill 3, when the vibration caused by an external impulse or vibration caused by a built-in speaker in a television receiver set becomes equal to the inherent vibration of the grid elements 11 in frequency, the grid elements 11 are resonated. The vibration of the grid elements 11 causes the electron beam to be incorrectly detected relative to the colour phosphor stripe and hence causes the deterioration of the picture quality. In order to avoid the mislanding of the electron beam, in the prior art, a damper 13 made of a tungsten wire with the diameter in a range from 20 $\mu$m to 30 $\mu$m is stretched. This damper 13 is used to hold the grid elements 11 and to transmit the vibration of the grid elements 11 in sequence to the adjacent grid elements to thereby dampen or suppress such vibration. Nevertheless, in the prior art having the above structure, since resonance frequencies of the respective grid elements 11 are substantially the same, the damping effect for the vibration of adjacent grid elements 11 is not satisfactory. The adjacent grid elements 11 coupled to one another by the damper 13 are resonated at the same frequency. The vibration of the grid element 11 was merely prevented by the set of grid elements 11 which are substantially separated, so that it was impossible to achieve the sufficient prevention of the vibration. The deterioration of the picture quality caused by the vibration phenomenon of the grid elements 11 becomes more and more noticeable with the high-definition cathode ray tube.

OBJECTS AND SUMMARY OF THE INVENTION

Accordingly, it is an object of the present invention to provide a cathode ray tube which can obviate the aforesaid defects inherent to a conventional cathode ray tube.

It is another object of the present invention to provide a cathode ray tube which can attenuate the vibration of an aperture grill in a short time period.

It is a further object of the present invention to provide a cathode ray tube which can avoid any deterioration of the picture quality caused by the vibration of the aperture grill.

According to one aspect of the present invention, there is provided a cathode ray tube comprising:

(a) a phosphor layer formed on an inner surface of a panel of an envelope;

(b) a colour selecting aperture grill formed of a number of grid elements and located within said envelope opposing to said phosphor layer;

(c) a metal wire for coupling said number of grid elements;

(d) an electron gun located within a neck portion of said envelope; and (e) a deflecting means located around said neck portion of said envelope; said cathode ray tube being characterized in that a resonance frequency of at least one aperture grid element of said colour selecting aperture grill is selected so as to be different from that of another grid element in the vicinity thereof.

The other objects, features and advantages of the present invention will become apparent from the following description taken in conjunction with the accompanying drawings through which the like references designate the same elements and parts.

DESCRIPTION OF THE PREFERRED EMBODIMENTS

The outline of the present invention will be described first.

Figure 1:
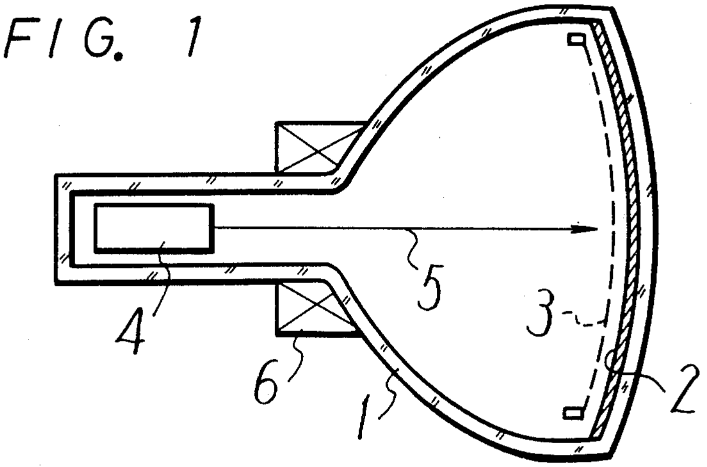
FIG. 1 is a schematic view of a cathode ray tube to which the present invention is applied.

A cathode ray tube according to the invention, is similarly constructed to the cathode ray tube as schematically illustrated in FIG. 1. That is, an example of the cathode ray tube according to the invention includes a glass envelope 1, an electron gun 4 located therein, a phosphor screen or layer 2 formed on the inner surface of the panel of the envelope 1 (which phosphor screen is composed of a set of R (red), G(green) and B(blue) color phosphor stripes) and an aperture grill 3 located in the envelope opposing to this phosphor layer 2 for selecting the colour. In this case, the aperture grill 3 is formed of a number of adjacent or neighboring grid elements which have different resonant frequencies each other.

A resonance frequency f of each of the grid elements is generally expressed as follows:

$$f=\frac{1}{2l}\sqrt{\frac{T\cdot g}{\rho}}$$

where g is the acceleration of gravity (980 cm/sec$^2$);

$\rho$ is the weight of one grid element per unit length (g/cm); and l is the length of one grid element.

T is determined by the material used.

In accordance with the present invention, the cross-sectional area of each of the grid elements is constructed differently along its lengthwise direction so as to make the line density of each different and to thereby product different resonance frequencies in each grid element. The portions which have different resonance frequency are formed such that the portions between adjacent or neighbouring grid elements 11 have resonant frequencies which are different from the adjacent grid elements. The partially different vibrations in each grid elements 11 determine the inherent vibration frequency for each of the grid elements 11. As a result, each of the grid elements has a different resonance frequency.

Since the adjacent or neighbouring grid elements 11 have different resonance frequencies, the vibration of the aperture grill 3 caused by the vibration generated by external impacts or by the built-in speaker in the television receiver set is transmitted through the damper 13 to the respective grid elements 11 and then cancelled and attenuated. Therefore, the deterioration of the picture quality caused by vibrations of the grid elements 11 will be avoided.

Figure 2:
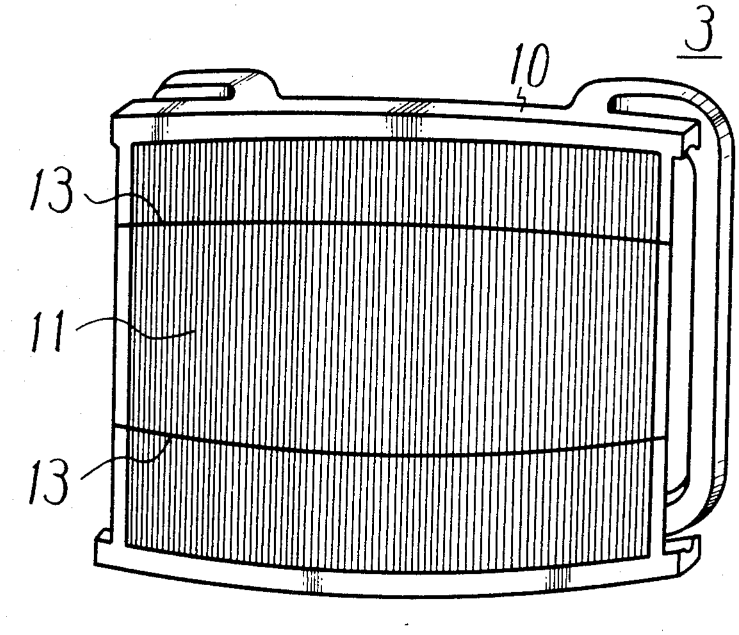
FIG. 2 (PRIOR ART)
FIG. 2 is a perspective view of a prior art aperture grill.
Figure 3:
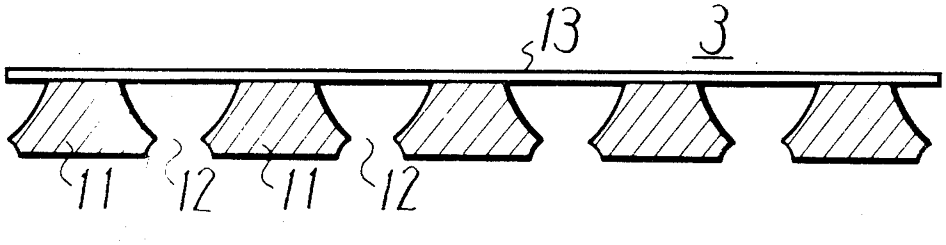
FIG. 3 (PRIOR ART)
FIG. 3 is a cross-sectional view thereof.

With reference to the drawings, embodiments of the cathode ray tube, particularly embodiments of the aperture grill according to the invention, which serves as the colour selecting electrode thereof, will be described hereinafter, in which like references corresponding to those of FIGS. 1, 2 and 3 designate the same elements and parts.

Figure 4:
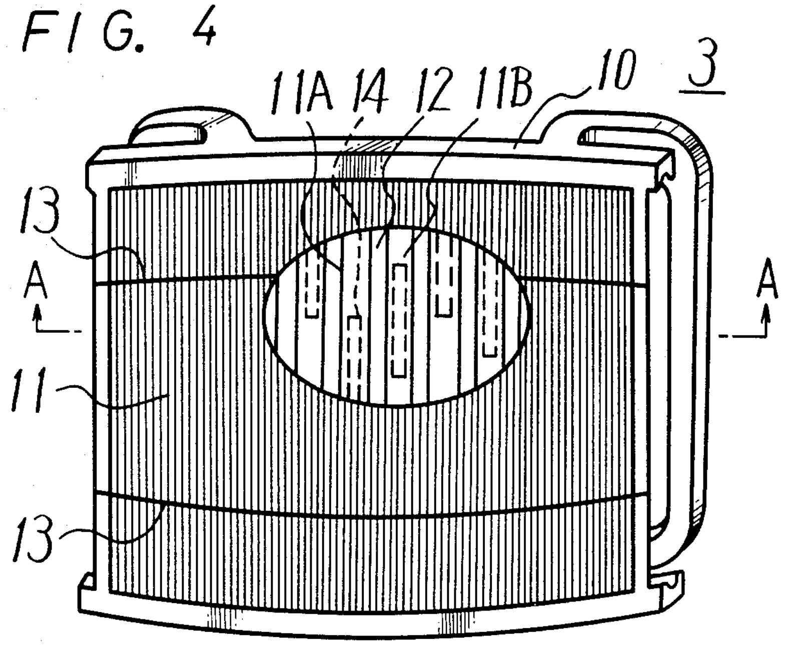
FIG. 4 is a cross-sectional view of an example of the aperture grill used in a cathode ray tube according to the present invention.
Figure 5:
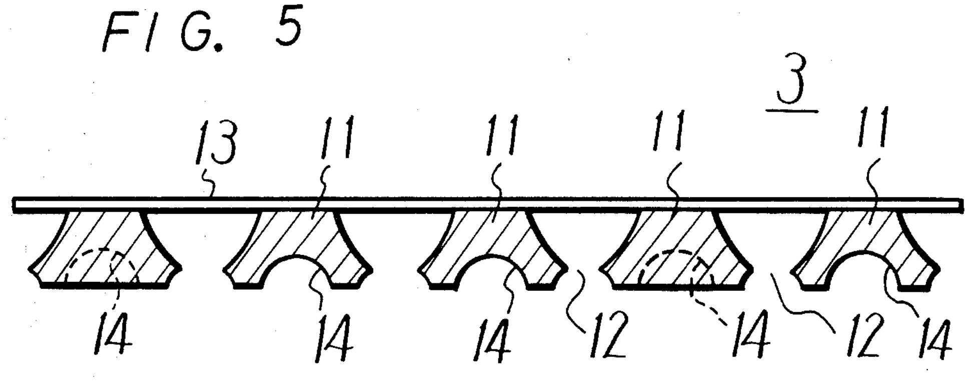
FIG. 5 is a cross-sectional view taken on line A—A in FIG. 4.

In a first embodiment of this invention, as shown in FIGS. 4 and 5, a number of band-shaped grid elements 11 are stretched between one pair of opposing sides of the frame 10 so as to be parallel to the phosphor stripes and apertures 12 serving as the beam transmitting apertures are formed between the adjacent grid elements 11. In this case, a groove 14 is partially formed on each of the grid elements 11 of the aperture grill 3 by selective etching technique or the like. Thus, the cross-sectional area of each of the grid elements 11 is made partially different. In this case, the pattern of the grooves 14 is made different from the adjacent grid elements 11 or the neighbouring grid element. The damper 13 made of a tungsten wire is stretched so as to contact the respective grid elements 11.

In accordance with the aperture grill 3 of this invention made as set forth just above, the cross-sectional area of each of the grid elements 11 is partially different and hence the linear density thereof is different along its lengthwise direction, and the vibration frequency thereof with the groove 14 is different from that of the portion with no groove 14. The different frequencies in portions of one grid element combine to present one inherent vibration frequency. Thus, the resonance frequencies of the neighbouring grid elements 11 or grid element groups are different from one another. For this reason, the inherent vibration of each grid elements 11 or the grid element groups caused by external shocks is transmitted to the adjacent or the neighbouring ones through the damper 13 and cancelled and then attenuated.

With such aperture grill 3, the attenuation effect for the vibration is remarkable and it has been proved that the attenuation time of the vibration is one-fifth to one-tenth of that of the prior art aperture grill (in which all the grid elements have the same resonance frequency).

Figure 6:
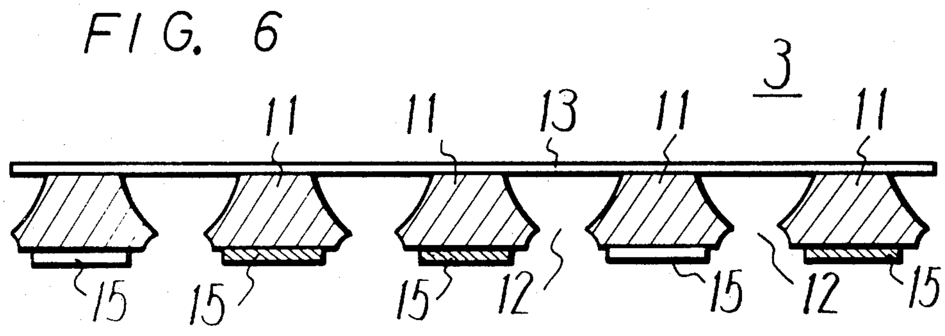
FIG. 6 is a cross-sectional view of an essential part of another example of the aperture grill according to the present invention similar to FIG. 5.

FIG. 6 shows another embodiment of the present invention in which a metal layer 15 is partially coated on each of the respective grid elements 11 by means of plating, evaporation or the like to make the cross-sectional area of a part of each of the grid elements 11 different from that of its other part and hence to make the linear density thereof partially different.

In accordance with the arrangement of FIG. 6, like the above embodiment of FIGS. 4 and 5, the resonance frequencies of the neighbouring grid elements 11 or the grid element groups are made to be different from one another, so that the vibrations of the grid elements 11 are attenuated in a short time period and hence there is no deterioration of the picture quality.

As described above, according to the cathode ray tube of the present invention, in its aperture grill 3, since the resonance frequencies of the neighbouring grid elements 11 are different, vibrations of the grid elements 11 caused by external shocks or by the built-in speaker in the television receiver set can be attenuated in a short time period. Therefore, the deterioration of the picture quality caused by the vibration of the aperture grill 3 is prevented. In the prior art, the aperture grill 3 requires a number of dampers 13 to prevent the vibration of the aperture grill 3, but in accordance with the present invention, the attenuation of the vibration can be effectively carried out, so that the number of the dampers 13 can be reduced.

In general, the amplitude of the vibration of the grid elements 11 depends upon the tension of the grid elements 11. In the prior art, the tension of the grid elements 11 is selected large so as to make the amplitude small as possible. Therefore, the weight of the frame 10 of the aperture grill 3 must be large to provide the frame with a structure to allow high tension. Further, such mechanical strength as to withstand the tension, that is, sufficient thickness is required for the grid elements 11. But, according to the present invention, since the vibration is attenuated in a short time period, the tension of the grid elements 11 can be selected to be smaller. Accordingly, the thickness of the grid elements 11 can be made thinner. Thus, the entire aperture grill 3 can be formed to have lighter weight.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A cathode ray tube comprising:

(a) a phosphor layer formed on an inner surface of a panel of an envelope;

(b) a colour selecting aperture grill formed of a number of grid elements and located within said envelope opposing to said phosphor layer;

(c) a metal wire extending transversely of said grid element and incontact therewith for coupling together said grid elements;

(d) an electron gun located within said envelope; and (e) a deflecting means located around said envelope; said cathode ray tube being characterized in that the resonance frequency of at least one grid element of said colour selecting aperture grill is different from that of at least another grid element in the vicinity of said at least one grid element, and said difference in resonant frequency in said grid elements is caused by forming longitudinal grooves in grid elements which extend only a portion of the lengths of said grid elements and wherein said grooves are offset from each other such that adjacent grid elements are not formed with grooves which are aligned.

2. A cathode ray tube comprising:

(a) a phosphor layer formed on an inner surface of a panel of an envelope;

(b) a colour selecting aperture grill formed of a number of grid elements and located within said envelope opposing to said phosphor layer;

(c) a metal wire extending transversely of said grid element and in contact therewith for coupling together said grid elements;

(d) an electron gun located within said envelope; and (e) a deflecting means located around said envelope; said cathode ray tube being characterized in that the resonance frequency of at least one grid element of said colour selecting aperture grill is different from that of at least another grid element in the vicinity of said at least one grid element, and said difference in resonant frequency in said grid elements is caused by metal layers on said grid elements which extend only a portion of the lengths of said grid elements and wherein said metal layers are offset from each other such that adjacent grid elements do not have metal layers which are aligned.

* * * * *